(12) United States Patent
Cole et al.

(10) Patent No.: US 7,027,354 B2
(45) Date of Patent: Apr. 11, 2006

(54) METHOD OF OBTAINING PORE PRESSURE AND FLUID SATURATION CHANGES IN SUBTERRANEAN RESERVOIRS BY FORWARD MODELING

(75) Inventors: Stephen P. Cole, Huntington Beach, CA (US); David E. Lumley, Laguna Beach, CA (US); Mark A. Meadows, Aliso Viejo, CA (US)

(73) Assignee: 4th Wave Imaging Corp., Aliso Viejo, CA (US)

( * ) Notice: Subject to any disclaimer, the term of this patent is extended or adjusted under 35 U.S.C. 154(b) by 277 days.

(21) Appl. No.: 10/667,831

(22) Filed: Sep. 22, 2003

(65) Prior Publication Data

US 2005/0073910 A1    Apr. 7, 2005

(51) Int. Cl.
*G01V 1/28* (2006.01)
(52) U.S. Cl. .......................................... 367/73; 367/38
(58) Field of Classification Search .................. 367/37, 367/38, 47, 73
See application file for complete search history.

(56) References Cited

U.S. PATENT DOCUMENTS

| 5,586,082 | A | | 12/1996 | Anderson et al. ............. 367/73 |
| 6,152,226 | A | * | 11/2000 | Talwani et al. ........... 166/252.4 |
| 6,246,963 | B1 | * | 6/2001 | Cross et al. ................... 702/14 |
| 6,438,069 | B1 | * | 8/2002 | Ross et al. ..................... 367/73 |
| 6,715,551 | B1 | * | 4/2004 | Curtis et al. ............ 166/250.16 |
| 2002/0173917 | A1 | * | 11/2002 | Nickel ......................... 702/14 |
| 2005/0007876 | A1 | * | 1/2005 | Castagna et al. ............. 367/38 |

FOREIGN PATENT DOCUMENTS

WO    WO02/10798 A1 *  7/2002

OTHER PUBLICATIONS

Brevic, I., 1999 Rock model based inversion of saturation and pressure changes from time lapse sesimic dta: 69th Annual International Meeting, Society Exploration Geophysicist, Expanded Abstracts, 1044-1047.
Castagna, J.P. and Backus, M.M., Eds., 1993, Offset-Dependent Reflectivity-Theory and Practice of AVO Analysis:Society Exploration Geophysicist, 348 pp.

(Continued)

*Primary Examiner*—Thomas H. Tarcza
*Assistant Examiner*—Scott A. Hughes
(74) *Attorney, Agent, or Firm*—John S. Reid

(57) ABSTRACT

Representative embodiments provide for a computer including a program code configured to cause a processor to invert and thereafter calibrate first and second data sets, subtract the inverted second data set from the inverted first data set to derive a time-lapse data set, calculate a model including a plurality of parametric values, sort the plurality of parametric values into a plurality of bins, select, map and calibrate a plurality of optimal parametric values from the plurality of bins, and plot the plurality of calibrated optimal parametric values to represent at least one physical characteristic of a subterranean reservoir of hydrocarbons. The method includes deriving a time-lapse data set from a first seismic data set and a second seismic data set, deriving a model, sorting the plurality of values into bins, selecting, mapping and calibrating a plurality of optimal values from the bins, and plotting the calibrated values.

34 Claims, 20 Drawing Sheets

OTHER PUBLICATIONS

Cole, S., Lumley, D., Meadows, M., and Tura, A., 2002 Pressure and saturation inversion of 4D seismic data by rock physics forward modelling: 72 Annual International Meeting, Society Exploration and Geophysicists, Expanded Abstracts, 2475-2478.

Cole, S., Lumley, D., Meadows, 2003 Pressure and saturation inversion of Schiehallion Field by rock physics modelling: 65th Conference and Techncial Exhibit, European Association of Geoscientists and Engineers, Extended abstracts, A-05.

Hoversten, G.M., Gritto, R., Washbourne, J., and Daily, T., 2002, Fluid saturation and pressure prediction in a multi-component reservoir by combined seismic and electromagnetic imaging: 72nd Annual International Meeting, Society of Exploration Geophysicists, Expanded Abstracts, 1770-1773.

Landro, M., 1999, Discrimination between pressure and fluid saturation changes from time lapse seismic data: 69th Annual International Meeting, Society of Exploration Geophysicists, Expanded Abstracts, 1651-1654.

Landro, M., 2001, Discrimination between pressure and fluid saturation changes from time lapse seismic data: Geophysics, 66, 836-844.

Lumley, D., Meadows, M., Cole, S., and Adams, D., 2003, Estimation of reservoir pressure and saturations by crossplot inversion of 4D seismic atributes: 65th Conf. and Tech. Exhibit., European Association of Geoscientists and Engineers, Extended Abstracts, A-06.

Tura, A., and Lumley, D.E., 1998, Subsurface fluid-flow properties from time-lapse elastic-wave reflection data: Proceedings fo SPIE, Mathematical Methods in Geophysical Imaging V, vol. 3453, 125-138.

Tura, A., and Lumley, D.E., 1999a, Estimating pressure and saturation changes from time lapse AVO data: 61st Conference and Technical Exhibition, European Association of Geoscientists and Engineers, Extended Abstracts, 1-38.

Tura, A., and Lumley, D.E., 1999b, Estimating pressure and saturation changes from time lapse AVO data: 69th Annual Intrenational Meeting, Society of Exploration Geophysicists, Expanded Abstracts, 1655-1658.

* cited by examiner

METHOD OF OBTAINING PORE PRESSURE AND FLUID SATURATION CHANGES IN SUBTERRANEAN RESERVOIRS BY FORWARD MODELING

BACKGROUND

The use of seismic data in the analysis and modeling of subterranean reservoirs containing hydrocarbons and other fluids is known. Typically, such data are gathered through the use of a source of seismic energy and one or more receivers respectively located on a ground or water surface over a subterranean region of interest. The source is used to produce a seismic pulse, burst, or similar energy which travels generally downward and away from the source, into the subterranean material of the region under examination.

As the seismic pulse encounters a change in material properties, most notably at an interface between one type of subterranean material and another, some of the seismic pulse energy is reflected back toward the surface. The receiver or receivers detect this reflected pulse energy and record corresponding data, often with respect to other parameters of interest such as linear distance from the particular receiver to the source, time-of-flight (i.e., time between emission of source pulse and detected reflection), amplitude of the detected reflection, angle of incidence of the detected reflection relative to the ground (or water) surface plane or some other datum, etc. Thus, the presence of the interface can be detected through later analysis of the detected and recorded pulse reflection data.

Generally, such pulse reflection and associated parameter data have been used to model, or estimate, the depths of these subterranean material interfaces and to present this information in the form of a cross-sectional elevation plot of the subterranean region of interest. However, such a plot often fails to provide other desirable information regarding the present physical state of a subterranean reservoir containing hydrocarbons or other fluids.

Therefore, it is desirable to provide a method and apparatus for modeling various other subterranean physical parameters, and to present that model in the form of planar view representation (as well as 3D view presentation) of the subterranean region of interest.

SUMMARY

One embodiment of the present invention provides for a method of modeling seismic data. The method includes deriving a time-lapse data set from a first seismic data set and a second seismic data set, and deriving a forward-modeled time-lapse data set including a plurality of values. The method further includes sorting the plurality of values into a plurality of bins corresponding to the forward-modeled time-lapse data set, selecting a plurality of optimal values from the plurality of bins, and then mapping the plurality of optimal values using the time lapse data set. The method also includes calibrating the plurality of optimal values. The method further includes plotting the plurality of calibrated optimal values.

Another embodiment provides for a method of modeling seismic data corresponding to a subterranean reservoir containing hydrocarbons. The method includes calibrating a first seismic data set and a second seismic data set, and then subtracting the calibrated second seismic data set from the calibrated first seismic data set to derive a time-lapse data set. The method further includes deriving a forward-modeled time-lapse data set including a plurality of physical parametric values, sorting the plurality of physical parametric values into a plurality of bins corresponding to the forward-modeled time-lapse data set, and selecting a plurality of optimal physical parametric values from the plurality of bins of physical parametric values. The method also includes mapping the plurality of optimal physical parametric values to a corresponding plurality of subterranean locations using the time-lapse data set, and calibrating the plurality of optimal physical parametric values. The method also includes plotting the plurality of calibrated optimal physical parametric values as a visual representation of the subterranean reservoir containing hydrocarbons.

Yet another embodiment provides for a computer which includes a processor and a computer-readable storage medium coupled in data communication with the processor. The computer-readable storage medium stores a first data set and a second data set and a plurality of rock physics relationships and a program code. The program code is configured to cause the processor to calibrate each of the first and second data sets, and then to subtract the calibrated second data set from the calibrated first data set to derive a time-lapse data set. The program code is further configured to cause the processor to calculate a forward-modeled time-lapse data set including a plurality of parametric values using selected ones of the plurality of rock physics relationships. The program code is still further configured to sort the plurality of parametric values into a plurality of bins corresponding to the forward-modeled time-lapse data set, and to select a plurality of optimal parametric values from the plurality of parametric values sorted into the plurality of bins. The program code is further configured to cause the processor to map the plurality of optimal parametric values to a corresponding plurality of subterranean locations using the time-lapse data set, calibrate the plurality of optimal parametric values, and to plot the plurality of calibrated optimal parametric values to visually represent at least one spatially distributed physical characteristic of a subterranean reservoir of hydrocarbons.

These and other aspects and embodiments will now be described in detail with reference to the accompanying drawings, wherein:

DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a mapping diagram referring to exemplary data plots 3A–3D in accordance with the present invention.

DETAILED DESCRIPTION

In representative embodiments, the present teachings provide methods and apparatus for acquiring and processing seismic data corresponding to a subterranean region of interest, typically containing hydrocarbons, and to plot a final processed data set as a graphic representation of time-lapse changes to various selected physical parameters of the subterranean region of interest.

Figure 1:
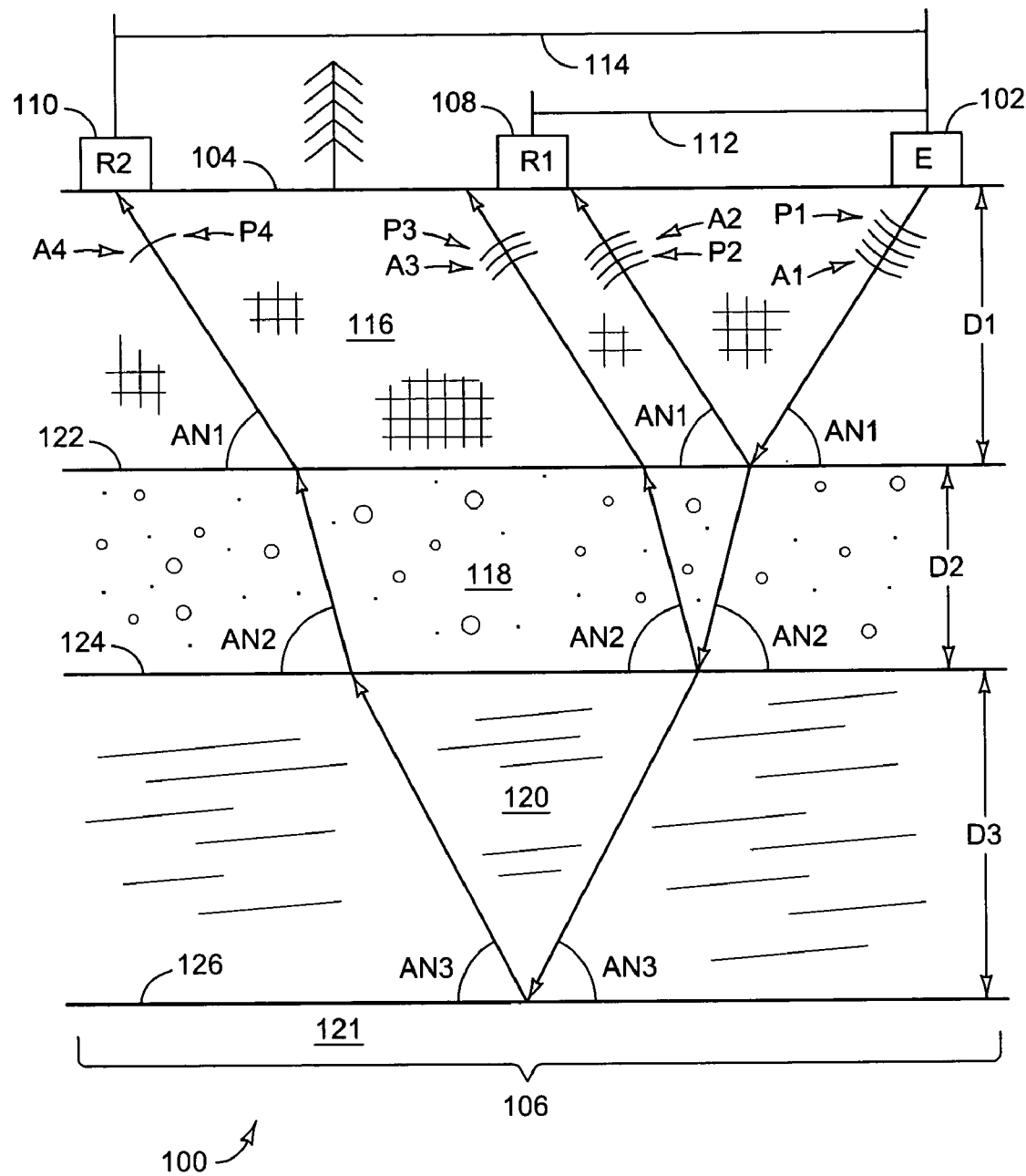
FIG. 1 is a side elevation sectional view depicting a field seismology arrangement in accordance with an embodiment of the present invention.

Turning now to FIG. 1, a side elevation sectional view depicts a field seismology arrangement 100 in accordance with an embodiment of the present invention. The arrangement 100 includes a source (i.e., emitter) of seismic energy 102. The source 102 is located on a ground surface 104 over a subterranean region 106. The source 102 can be defined by any suitable apparatus capable of producing a seismic (acoustic) pulse or vibrational energy which is directed generally into the subterranean region 106.

The field seismology arrangement 100 further includes a pair of seismic detectors 108 and 110, respectively (also known as "receivers", as for example geophones, or hydrophones when the surface 104 is underwater). Each of the seismic detectors 108 and 110 rests on the ground surface 104, and is spaced apart from the source 102 by an offset distance 112 or 114, respectively. Each of the seismic detectors 108 and 110 can be defined by any detection device suitable for detecting and recording seismic energy pulses or reflections (described in detail hereafter) that arrive at the detectors 108 and 110 after passing through the subterranean region 106.

The subterranean region 106 includes three different material strata designated as 116, 118 and 120, respectively. Each of the material strata 116, 118 and 120 is respectively defined by a depth D1, D2 and D3. Furthermore, the region 106 includes an interface 122 between the material strata 116 and 118, an interface 124 between the material strata 118 and 120, and an interface 126 between the material strata 120 and an underlying region 121. It is assumed that each of the strata 116, 118 and 120 includes a respective average material incompressibility, fluid content (or lack thereof), and other physical parameters that distinguish it from the other respective material strata.

Typical operation of the field seismology arrangement 100 is as follows: the source 102 produces a source seismic pulse P1 of known amplitude A1. The source pulse P1 is directed into the subterranean region 106 and proceeds initially through the material strata 116, striking the interface 122 at angle of incidence AN1. A portion of the energy of pulse P1 is reflected from the interface 122 back toward the surface 104, as reflection pulse P2, at an angle of reflection AN1. The pulse P2 arrives at surface 104 within detectable vicinity to the seismic detector 108, having amplitude A2 upon arrival.

The seismic detector 108 records data corresponding to the detection of the reflection pulse P2. This recorded data can include, for example, a detected amplitude corresponding to amplitude A2 of the pulse P2, the detected angle of reflection (i.e., incidence) AN1 of the pulse P2, the offset distance 112, the arrival time of the detected pulse P2 relative to the (known) time of emission of the source pulse P1, etc. It will be appreciated that the seismic detector 108 only transitorily "records" data, and that in fact the detector 108 transmits the data to a permanent recording station (not shown) for recording on computer readable media such as a magnetic tape or a hard disk drive.

As the source pulse P1 continues into the subterranean region 106, similar reflection pulses P3 and P4 are reflected from interfaces 124 and 126, respectively. The reflection pulse P3 is initially reflected from the interface 124 back toward the surface 104 at an angle of AN2, and is then refracted at the interface 122 to a new angle of incidence AN1. Thus, the reflection pulses P3 and P4 arrive at the surface 104 within detectable vicinity of the seismic detectors 108 and 110, respectively. The seismic detectors 108 and 110 then record data corresponding to the reflected pulses P3 and P4. This recorded data can include any or all of the various characteristics described above in regard to the pulse P2.

The data thus received by the seismic detectors 108 and 110 are recorded and then communicated to a suitable analytical apparatus (i.e., a computer) for analysis by way of the method of the present invention, described in detail hereafter.

It is to be understood that the field seismology arrangement 100 of FIG. 1 is intended to convey conceptual information regarding the acquisition of seismic data as used in the methods of the present invention, and that a similar field seismology arrangement (not shown) can include any suitable number of seismic energy sources (i.e., source 102) and seismic detectors (i.e., detector 108) arranged in a linear or matrix pattern on a ground surface (i.e., surface 104) or on a water surface in the case where the ground surface 104 is submerged under water. Thus, the field seismology arrangement 100 of FIG. 1 is exemplary of the data acquisition of the present invention and does not represent the only type of such arrangement that can be used, nor does it represent the only type of field conditions under which data acquisition can be performed within the context of the present invention.

Figure 2:
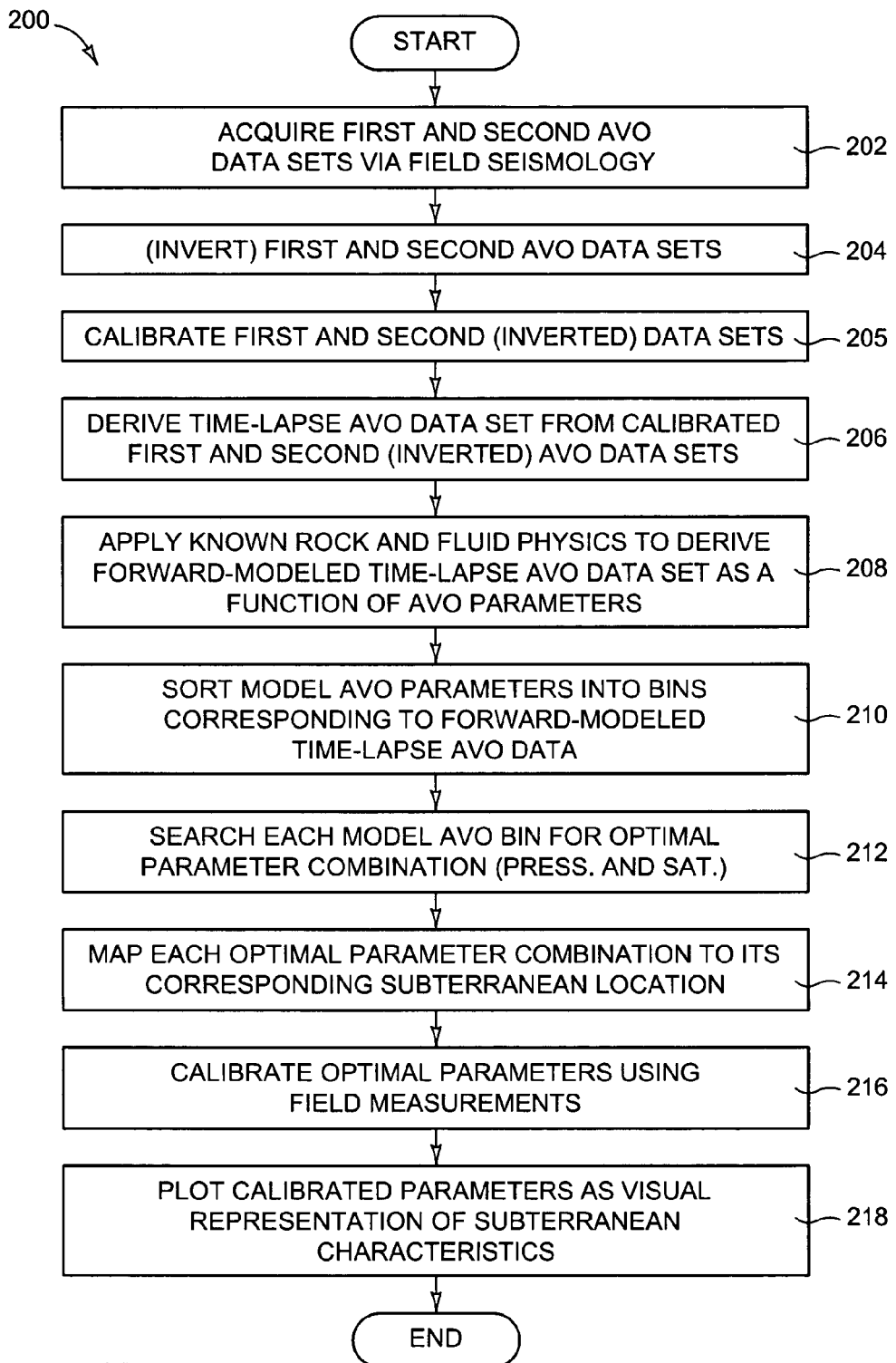
FIG. 2 is a flowchart depicting a method of modeling seismic data in accordance with another embodiment of the present invention.

FIG. 2 is a flowchart depicting a method 200 in accordance with the present invention. Simultaneous reference shall be made, as directed, to FIGS. 1 and 3 through 9D, during the description of the method 200 of FIG. 2.

In step 202, amplitude-versus-offset (hereafter, AVO) field seismic data are acquired through the use of field seismology (e.g., the field seismology arrangement 100 of FIG. 1). These AVO data are acquired at a first time T1 and at a later time T2, and are generally collected over a subterranean region of interest such that an area at a given depth (i.e., stratum) is represented. AVO data for both generally planar and volumetric regions of interest can be suitably acquired.

In step 204, the AVO data are inverted to seismic impedance data using standard mathematical techniques. As a typical AVO data set is relatively vast, such inversion is generally done by way of electronic computer (see FIG. 10). The inverted data sets include P-wave pseudo impedance data (hereafter, IP') and S-wave pseudo impedance data (hereafter, IS'), and are referred to as IP'(T1), IS'(T1), IP'(T2), and IS'(T2).

In step 205, the P-wave and S-wave pseudo impedance data IP'(T1), IS'(T1), IP'(T2), and IS'(T2) are calibrated so as to correspond more closely with actual field conditions. This calibration can be performed in a number of different ways; non-limiting examples include: calibrating the pseudo values against like kinds of data (i.e., P-wave and S-wave impedance data) measured at selected well bores; or modeling the pseudo values using rock physics relationships (properties). Combinations of these or other calibration methods can also be used.

It is to be understood that such calibration is not necessarily linear in nature. In any case, the calibration method yields calibrated P-wave and S-wave impedance data IP (T1), IS (T1), IP(T2), and IS(T2) for the subterranean region under consideration.

Exemplary plots of such calibrated data IP(T1), IS(T1), IP(T2), and IS(T2) are respectively depicted in FIGS. 3A, 3B, 3C, and 3D. Within FIGS. 3A–3D, color is indicative of the signal or seismic wave impedance, with red indicative of seismic wave impedance values at the lower end of the represented scale, and blue used to indicate seismic impedance values at the higher end of the represented scale. The color white (or colorless) is used to indicate mid-scale seismic impedance values.

Figure 3A:
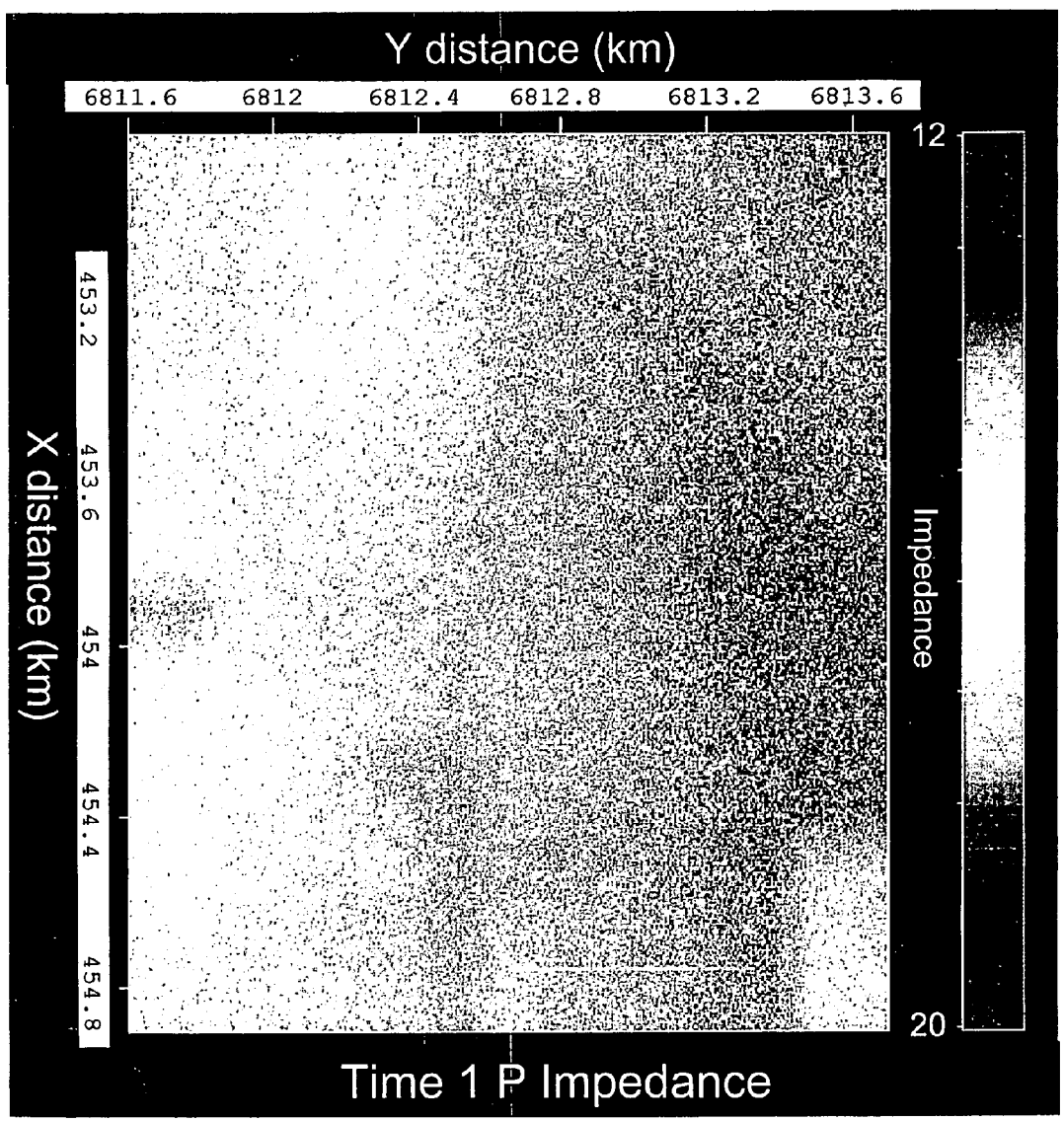
FIGS. 3A through 3D are data plots depicting exemplary P-wave and S-wave seismic data collected at times T1 and T2 in accordance with the present invention.
Figure 3B:
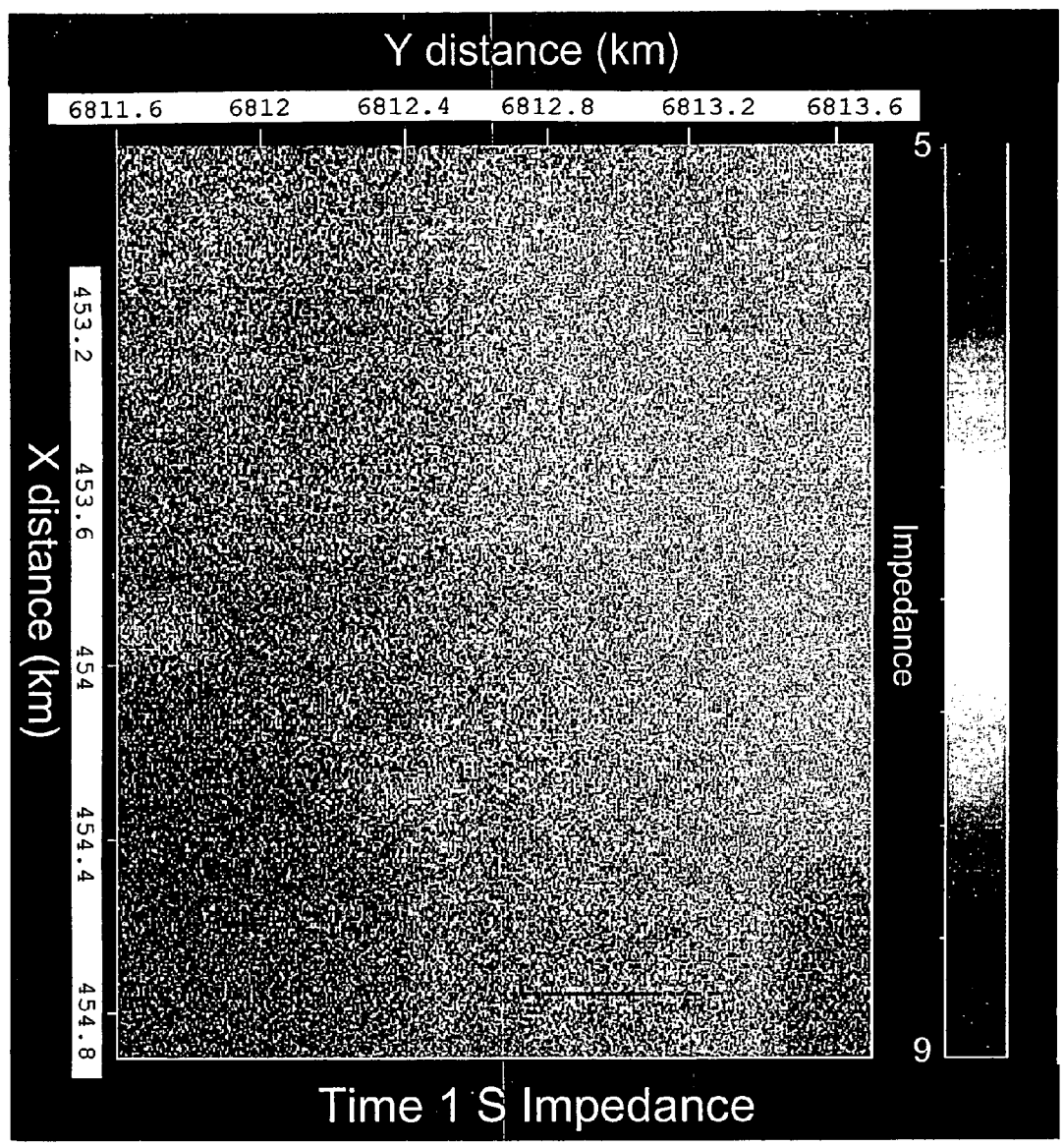
Figure 3C:
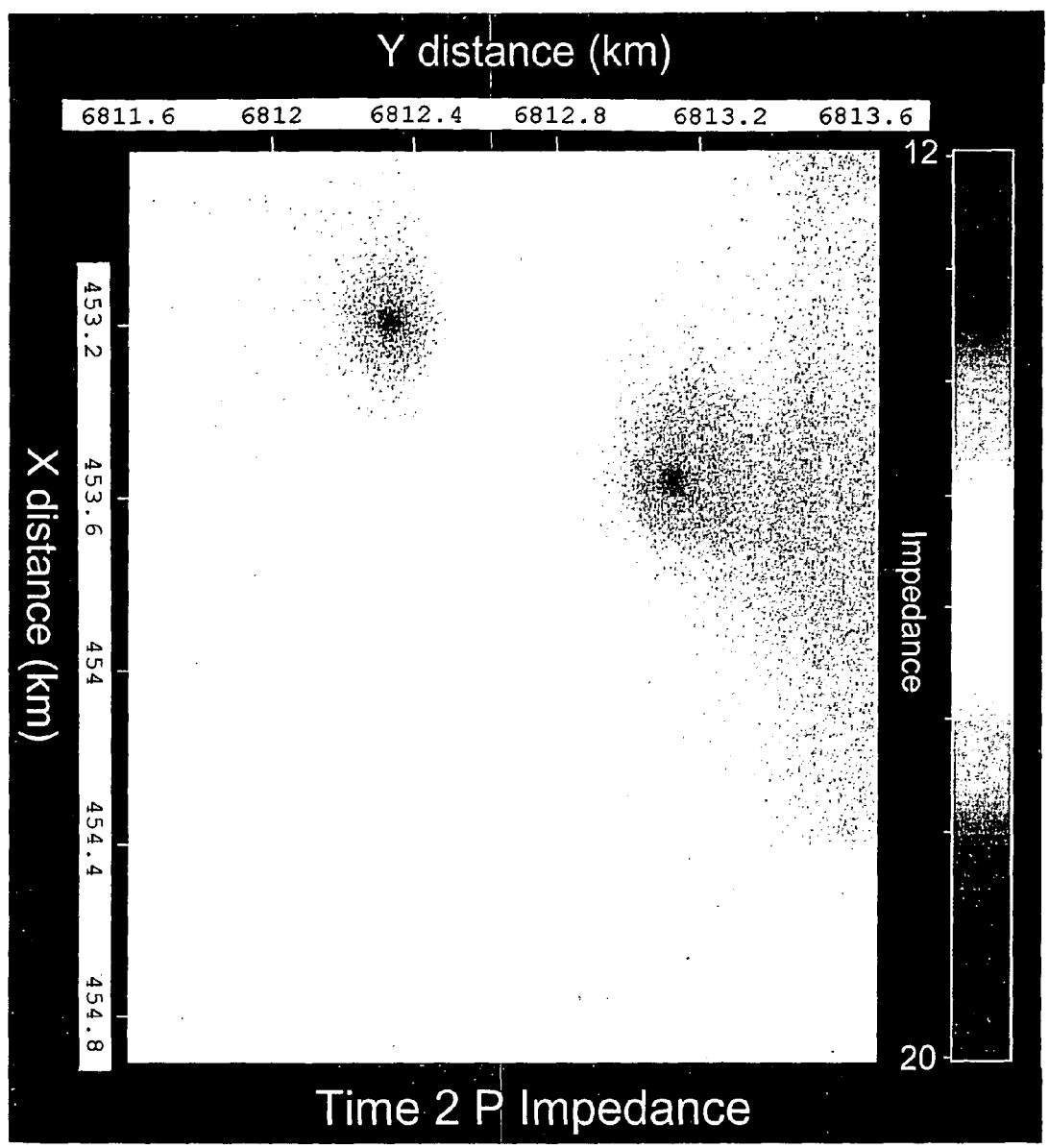
Figure 3D:
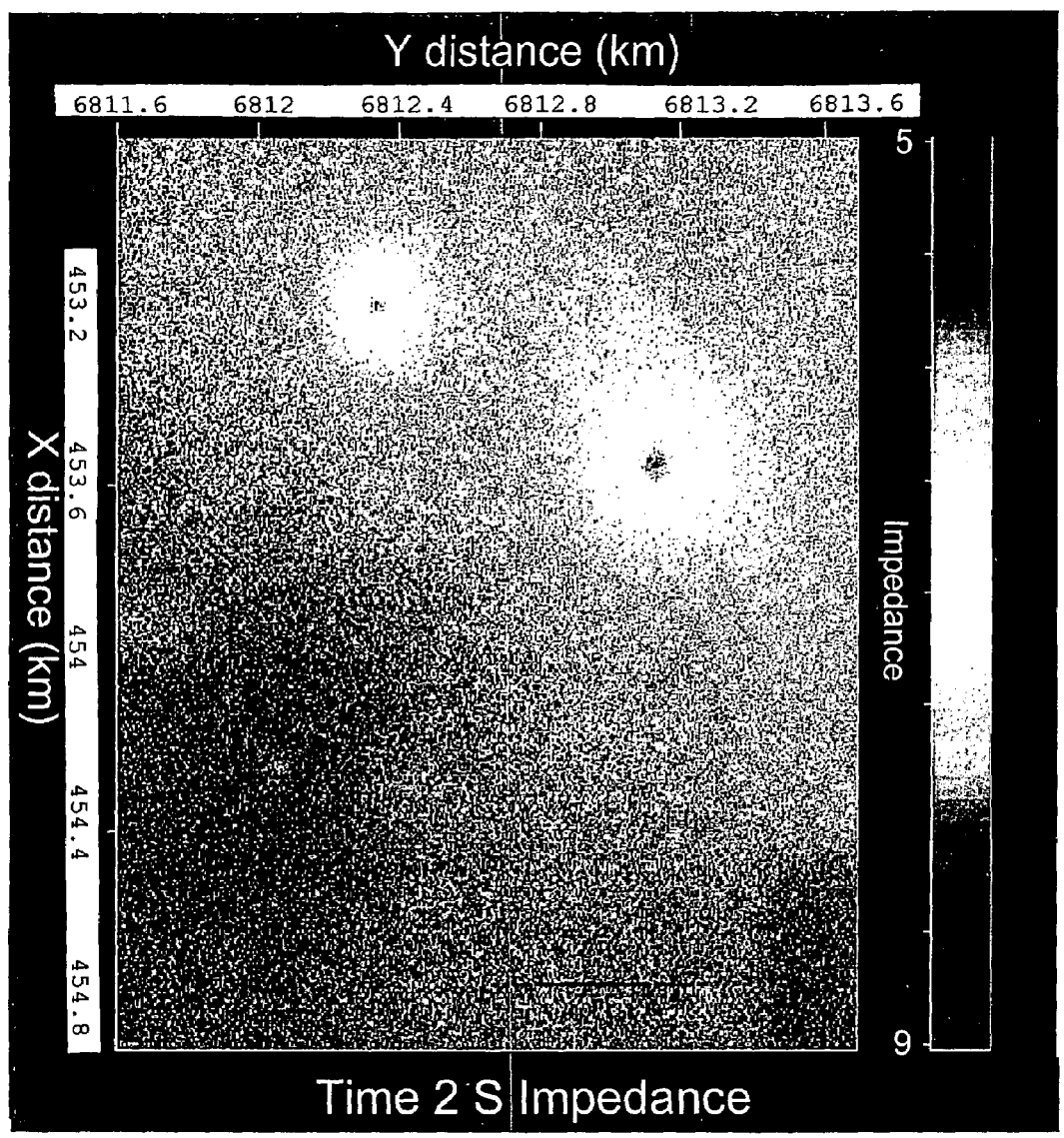

As such, FIGS. 3C and 3D each depict the presence of two spot locations where a generally distinct decrease in seismic wave impedance has occurred, relative to the same locations in FIGS. 3A and 3B. These spot decreases (i.e., changes) in seismic wave impedance correspond to physical changes within the subterranean region of interest, such as, for example, changes in porosity, pore pressure, saturation, etc.

In step 206, the inverted AVO data matrices derived in step 204 are subtracted in accordance with the two following formulas, thus providing the indicated time-lapse data (i.e., recorded field data):

$$TL(IP)=[IP(T2)-IP(T1)] \quad \quad 1)$$

$$TL(IS)=[IS(T2)-IS(T1)] \quad \quad 2)$$

It is important to note that time-lapse data required by this embodiment of the present invention need not be seismic impedance (i.e., inverted AVO) data as described above for step 204. Any time lapse data that can be forward-modeled from a set of physical parameters within the context of the present invention can potentially be used in step 206. Thus, in another embodiment (not shown) of the present invention, a method using appropriate AVO data acquired in step 202 can dispense with (i.e., skip over) the inverting of step 204 above and proceed directly to the calibrating of step 205 above. Other methods (not shown) in accordance with other embodiments of the present invention can also be used.

Figure 4:
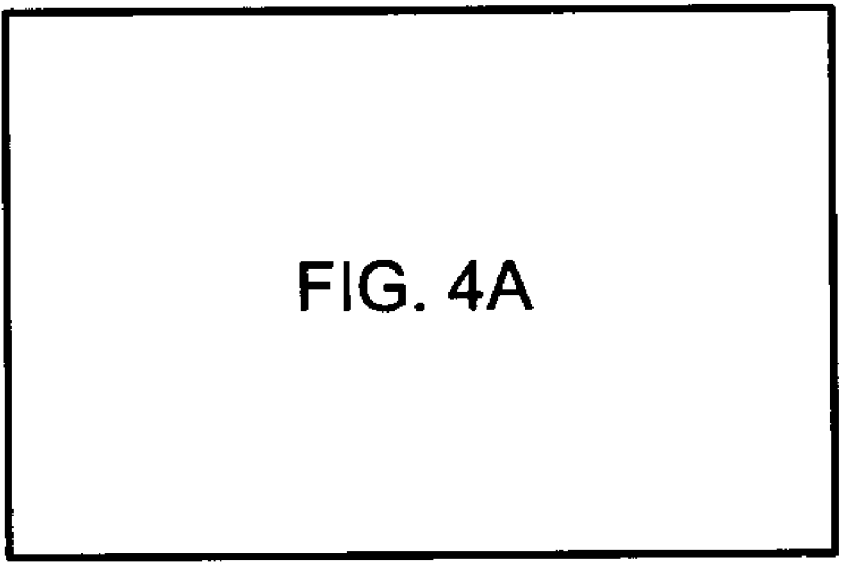
FIG. 4 is a mapping diagram referring to exemplary data plots 4A–4B in accordance with the present invention.
Figure 4:
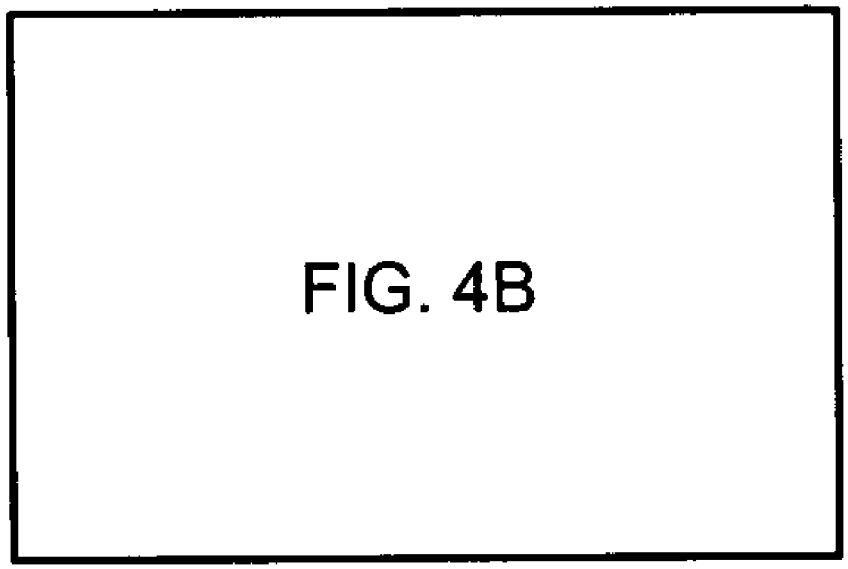
Figure 4A:
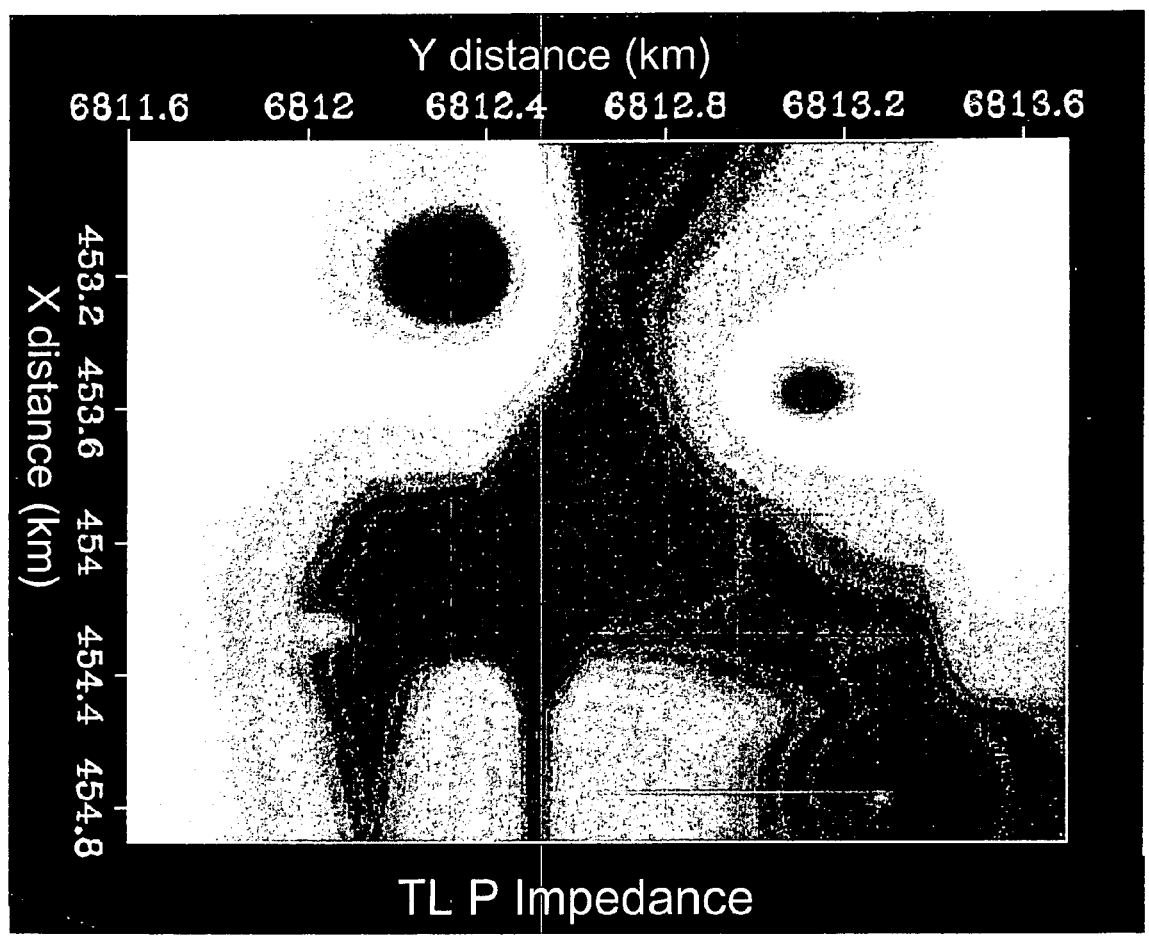
FIGS. 4A and 4B are data plots depicting exemplary inverted time-lapse P-wave and S-wave seismic data in accordance with the present invention.
Figure 4B:
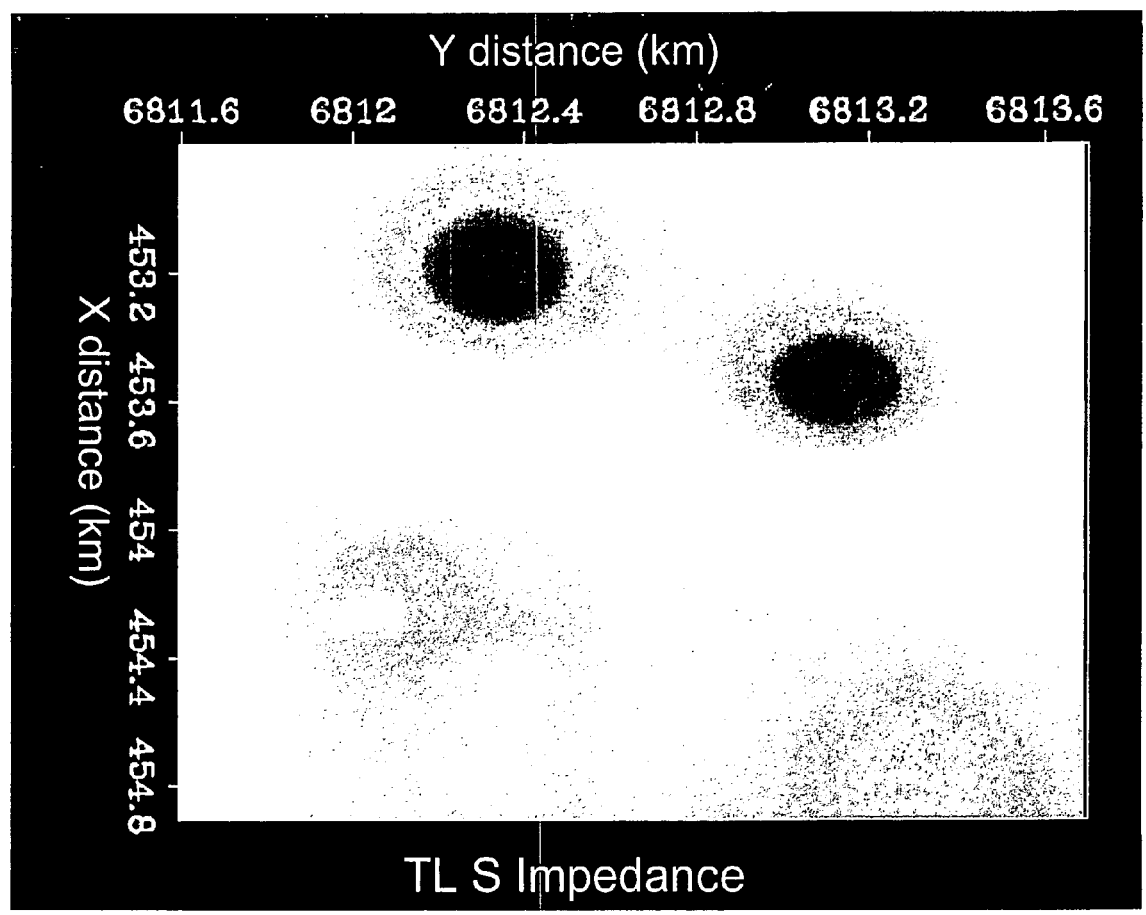

Exemplary plots of such time-lapse data are respectively depicted in FIGS. 4A and 4B. As described above, color is indicative of (i.e., in correspondence to) seismic wave impedance value within FIGS. 4A and 4B. The time-lapse data TL(IP) and TL(IS) derived within step 206 result in a generally more pronounced and distinct indication of physical changes within the subterranean region. As shown in FIGS. 4A and 4B, the two spot locations described above are clearly pronounced, and are assumed to be indicative of a subterranean physical change of interest (i.e., porosity, saturation, etc.), or a combination of such changes.

In step 208, selected known rock physics relationships and corresponding formulas are used to compute forward-modeled time-lapse data (i.e., synthetic data) FMTL(lp) and FMTL(ls). Typically, these relationships include such physical parameters as pore pressure, fluid saturation, and rock porosity. Such calculations can be generally represented by the two following formulas:

$$FMTL(IP)=F1[TL(\text{Saturation}), TL(\text{Pore Pressure}), TL(\text{Porosity})] \quad 3)$$

$$FMTL(IS)=F2[TL(\text{Saturation}), TL(\text{Pore Pressure}), TL(\text{Porosity})] \quad 4)$$

where F1 and F2 are selected rock physics relationships (i.e., formulas) that are functions of the desired physical parameters of porosity, saturation, and pore pressure. Other physical parameters, by way of their associated formulas, can also be considered such as, for example, temperature, salinity, gas-to-oil ratio (GOR), gas gravity, overburden pressure, etc.

Figure 5:
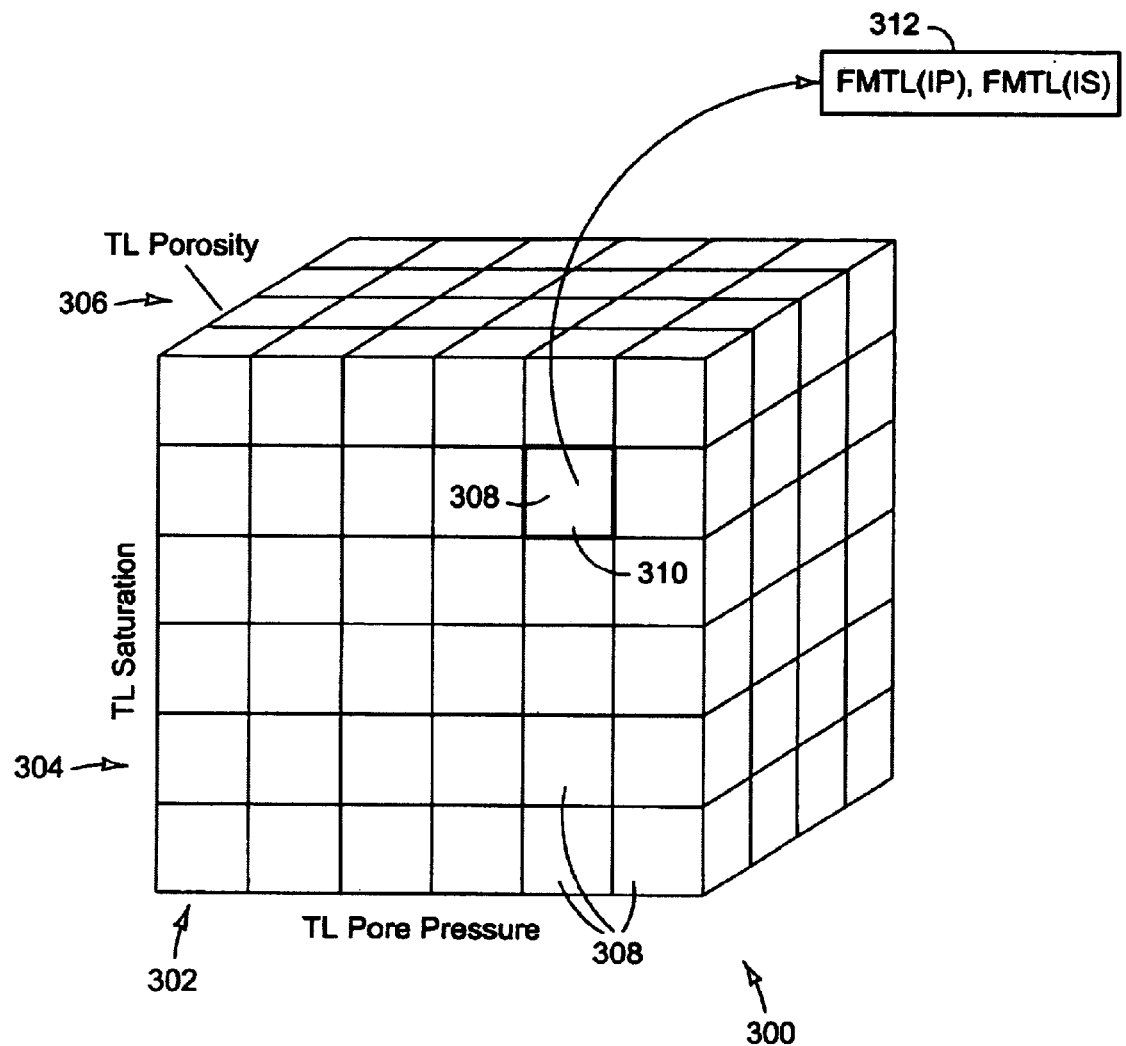
FIG. 5 is a block diagram depicting a data cube in accordance with an embodiment of the present invention.

Reference is now made to FIG. 5. These rock physics calculations are generally used to construct a data cube 300 of the three exemplary parameter types, respectively depicted as TL pore pressure 302, TL saturation 304, and TL porosity 306. The data cube 300 thus includes a plurality of three-dimensional cells 308, which respectively contain the forward-modeled time-lapse data FMTL(IP) and FMTL(IS) pair values corresponding to the coordinates (i.e., parametric values) of the particular cell 308. An exemplary cell 310 of the plurality of cells 308 is depicted, which includes corresponding FMTL(IP) and FMTL(IS) data pair contents 312. The data cube 300 therefore represents a three-dimensional data model of the subterranean region of interest. It is to be understood that if other physical parameters are considered, a corresponding data cube (not shown) can have four or more dimensions.

It is important to note that any given forward-modeled time-lapse data pair FMTL(IP) and FMTL(IS) can result from more than one corresponding set of physical parameters—that is, more than one cell 308 within the data cube 300. Typically, any given time-lapse data pair (for example, data pair 312) results from several corresponding sets of physical parameters, which can be visualized as rays or arcs of adjacent or near-adjacent, associated cells 308 within the data cube 300.

Figure 6:
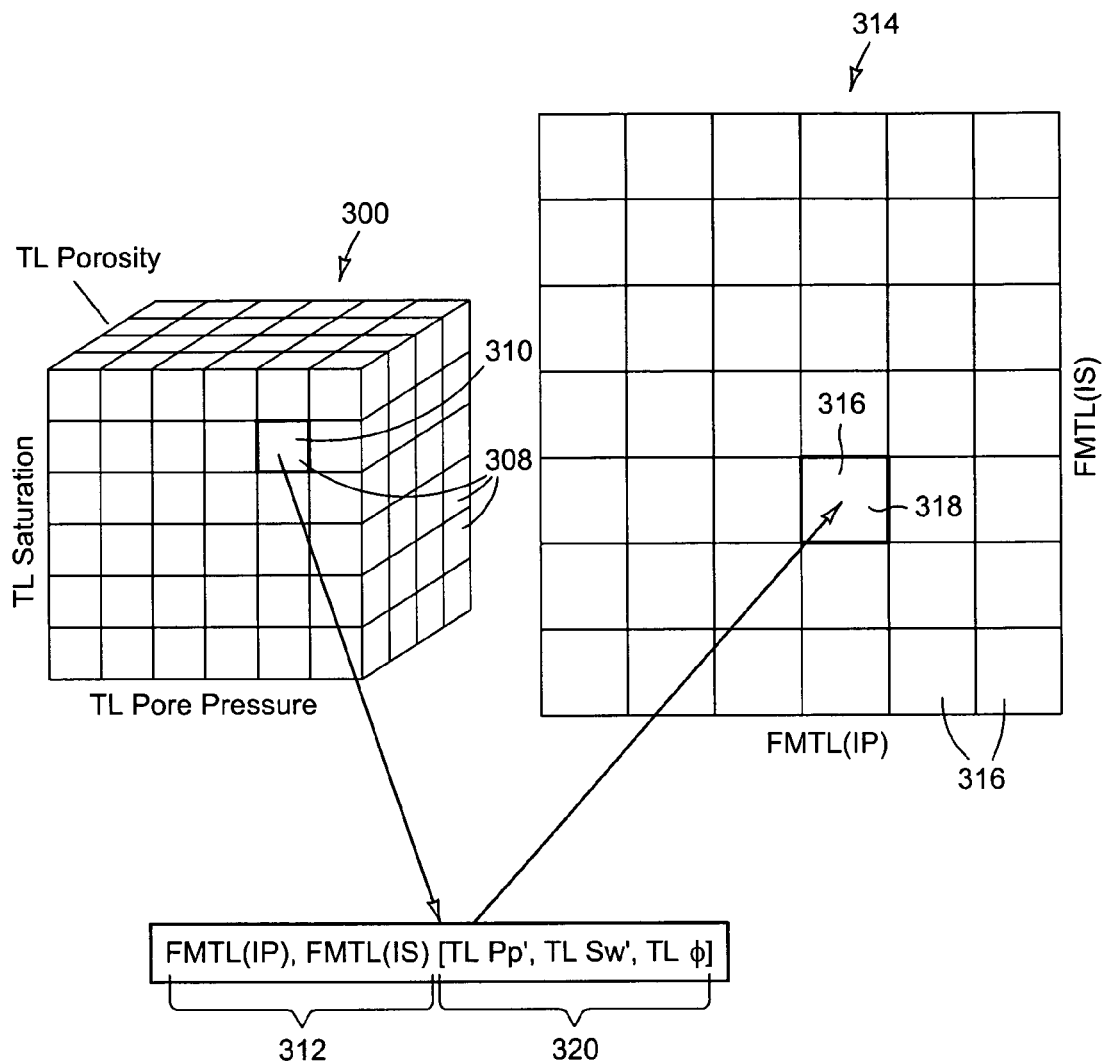
FIG. 6 is a block diagram depicting the data cube of FIG. 5 and a corresponding data array in accordance with an embodiment of the present invention.

In step 210, the forward-modeled time-lapse physics data within data cube 300 is sorted. Reference is now made to FIG. 6. A two-dimensional array 314 including a plurality of data bins 316 is constructed, with each data bin 316 defined by coordinates corresponding to the values of a particular forward-modeled time-lapse data pair (i.e., FMTL(IP) and FMTL(IS)). As described above, any particular forward-modeled time-lapse data pair can correspond to a plurality of derived physical parameters, and therefore several associated physical parameter sets, or vectors, can be sorted into any particular data bin 316 of the array 314. As depicted in FIG. 6, an exemplary data bin 318 of the plurality of data bins 316 is depicted, which contains (i.e., includes) an associated physical parameter vector 320. As depicted in FIG. 6, Pp' refers to pseudo pore pressure, Sw' refers to pseudo water saturation, and φ (phi) refers to porosity.

The sorting process is conducted in an exhaustive fashion until all the physical parameter vectors (i.e., 320) have been sorted into their respective data bins 316 within the array 314.

In step 212, the contents of each data bin 316 within the array 314 are compared (i.e., searched) to a predetermined, selected parameter value, so as to determine which particular physical parameter vector represents the "optimal" such vector within each data bin 316. For example, one approach for conducting this search is to compare each of the physical parameter vectors with an average or sample porosity value for the subterranean region under consideration. This comparison value can be predetermined, say, by use of appropriate field instrumentation deployed within a borehole or similar arrangement (not shown). Other search and comparison techniques can be used.

Figure 7:
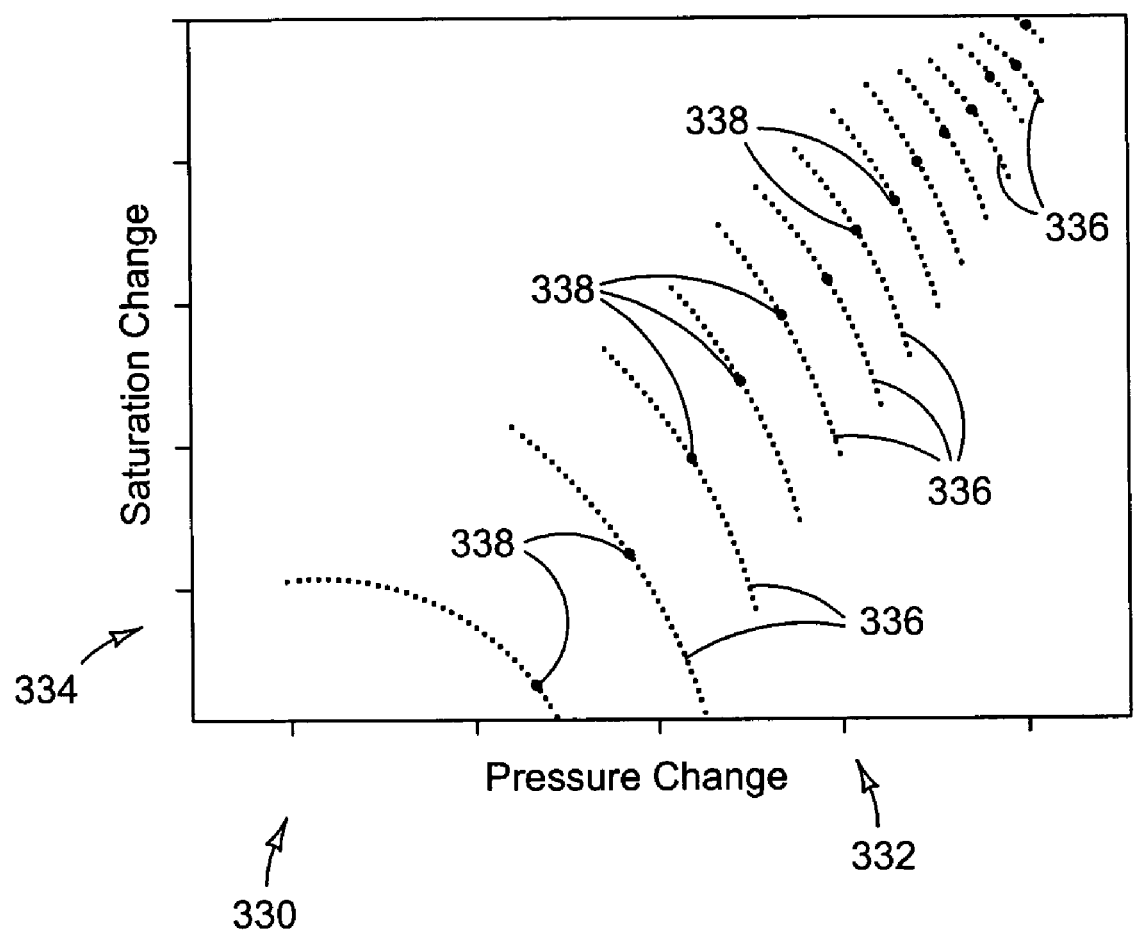
FIG. 7 is a locus plot in accordance with an embodiment of the present invention.

Reference is now made to FIG. 7, which is a plot 330 depicting the contents of the data bins 316 of the array 314, and is provided to assist in an understanding of the optimal value search operation of step 212 of the method 200. The plot 330 is formatted with a horizontal axis scaled to represent time-lapse pressure values 332, and a vertical axis scaled to represent time-lapse saturation values 334. Each of the data bins 316 of the array 314 has its physical parameter vectors plotted as a single locus 336 of values on the plot 330 (that is, there is one plotted locus 336 for each data bin 316).

Within each locus 336 is a selected optimum parameter pair (i.e., vector) value 338, including corresponding pressure 332 and saturation 334 values, as determined by the comparative search described above. The optimum pressure 332 and saturation 334 parameter pairs 338 are extracted for further use as described hereafter.

Figure 8:
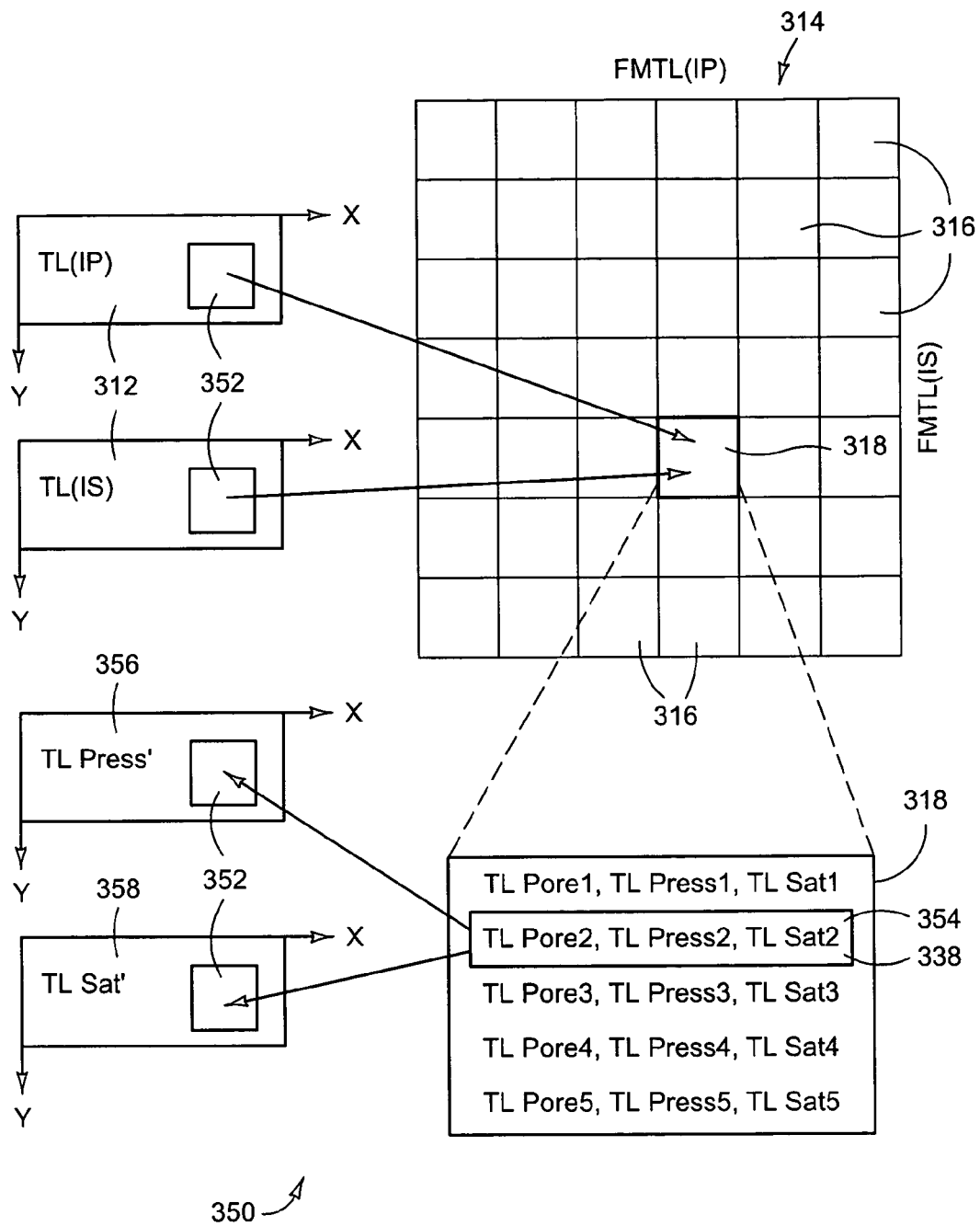
FIG. 8 is a block diagram depicting data mapping in accordance with an embodiment of the present invention.

In step 214, the optimum parameter pairs 338 are mapped to their corresponding locations within the subterranean area under consideration. Steps 210–214 are generally referred to as inversion. Reference is now made to FIG. 8, which depicts a parameter mapping schema 350 in accordance with the present invention. To begin, the time-lapse data pair TL(IP) and TL(IS) from step 206 for each location within the subterranean region under consideration is isolated, one data pair at a time. The data bin 316 within the array 314 that corresponds to the values of an isolated time-lapse data pair is then referenced, and its parameter vector contents considered. The optimal parameter vector 338 within that data bin 316, as determined in step 212 above, is then extracted from the data bin 316.

The desired discrete physical parameters within the optimal parameter vector 338 are then associated with the subterranean location of the original time-lapse data pair TL(IP) and TL(IS). As depicted in FIG. 8, the time-lapse data pair 312 is associated with a location 352 within the subterranean region corresponding to the original AVO data. Therefore, the particular optimal parameter vector 338, depicted as a vector 354, is also associated with the same location 352. As particularly depicted in FIG. 8, a pore pressure parameter 356 and a saturation parameter 358 of the vector 354 are associated with the location 352. These mapped, optimal parameters (i.e., pore pressure 356 and saturation 358) are also referred to as pseudo values, and are designated in FIG. 8 as TL Press' and TL Sat', respectively.

The mapping process of step 214 is generally repeated as described above, until optimal physical parameters are associated with each location within the subterranean region corresponding to the original AVO data.

In step 216, the pseudo values (i.e., TL Press' 356 and TL Sat' 358) mapped in step 214 above are calibrated so as to correspond more closely with actual field conditions. This calibration can be performed in a number of different ways; non-limiting examples include: calibrating the pseudo values against like kinds of data (i.e., pore pressures and saturations) measured at selected well bores; calibrating the pseudo values against a flow model of the subterranean region of consideration; or modeling the pseudo values against rock physics relationships (properties) in which only pore pressure changes or saturation changes. Combinations of these or other calibration methods can also be used. It is to be understood that such calibration is not necessarily linear in nature. In any case, the calibration method yields calibrated pore pressure and saturation data for the subterranean region under consideration.

Figure 9:
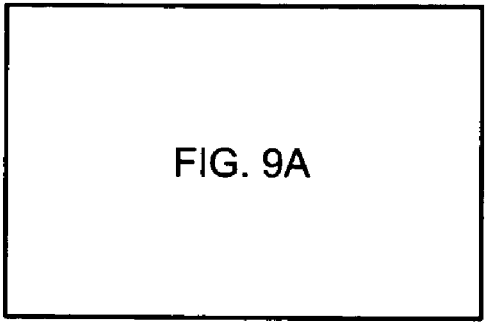
FIG. 9 is a mapping diagram referring to exemplary data plots 9A–9D in accordance with the present invention.
Figure 9:
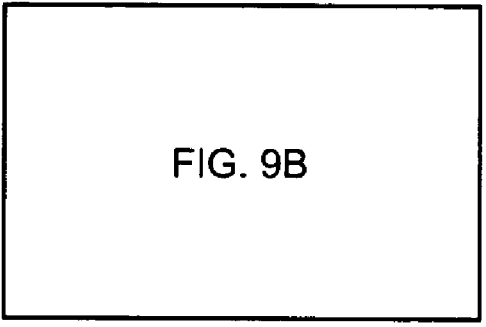
Figure 9:
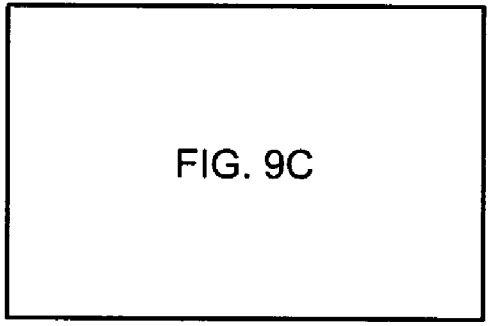
Figure 9:
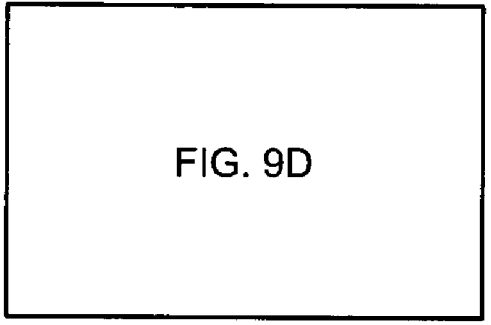
Figure 9A:
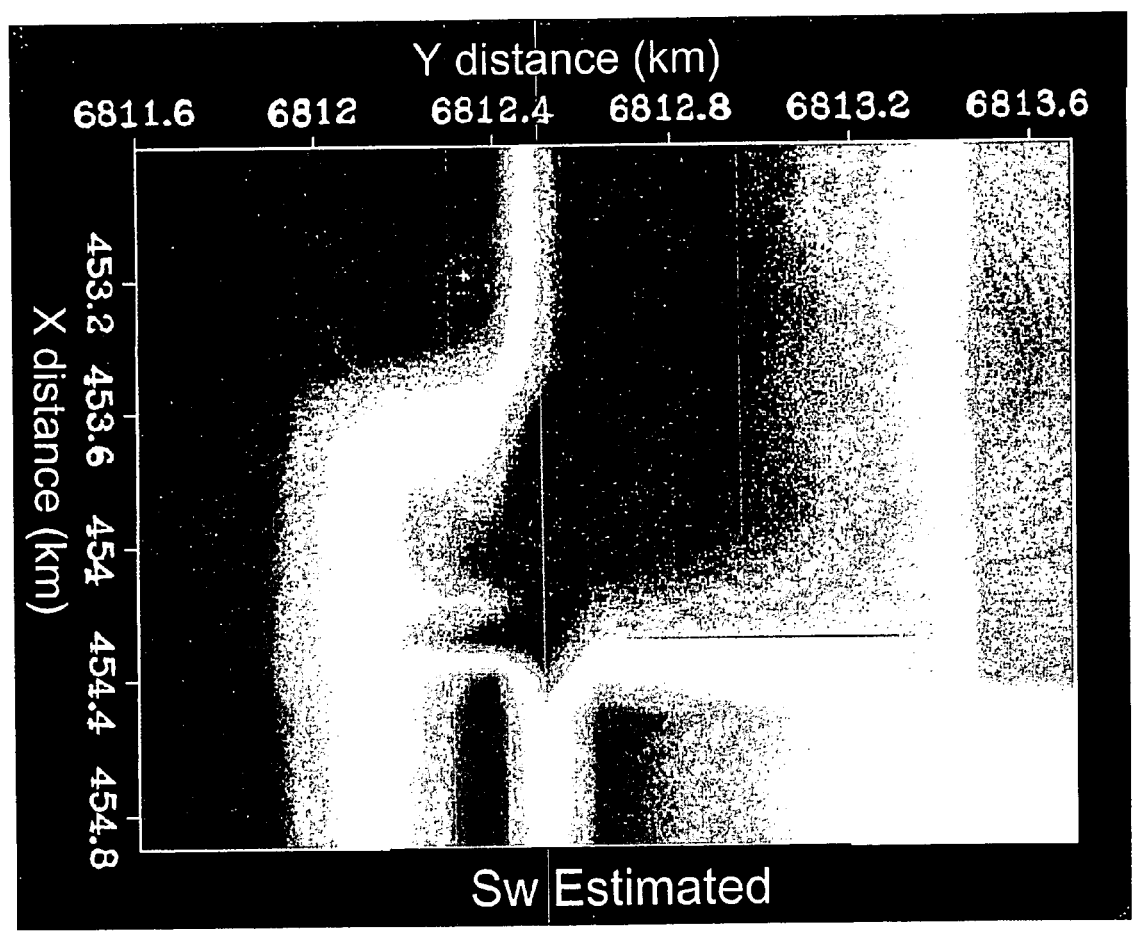
FIGS. 9A through 9D are data plots depicting exemplary calibrated and actual (true) saturation and pore pressure values in accordance with the present invention.
Figure 9B:
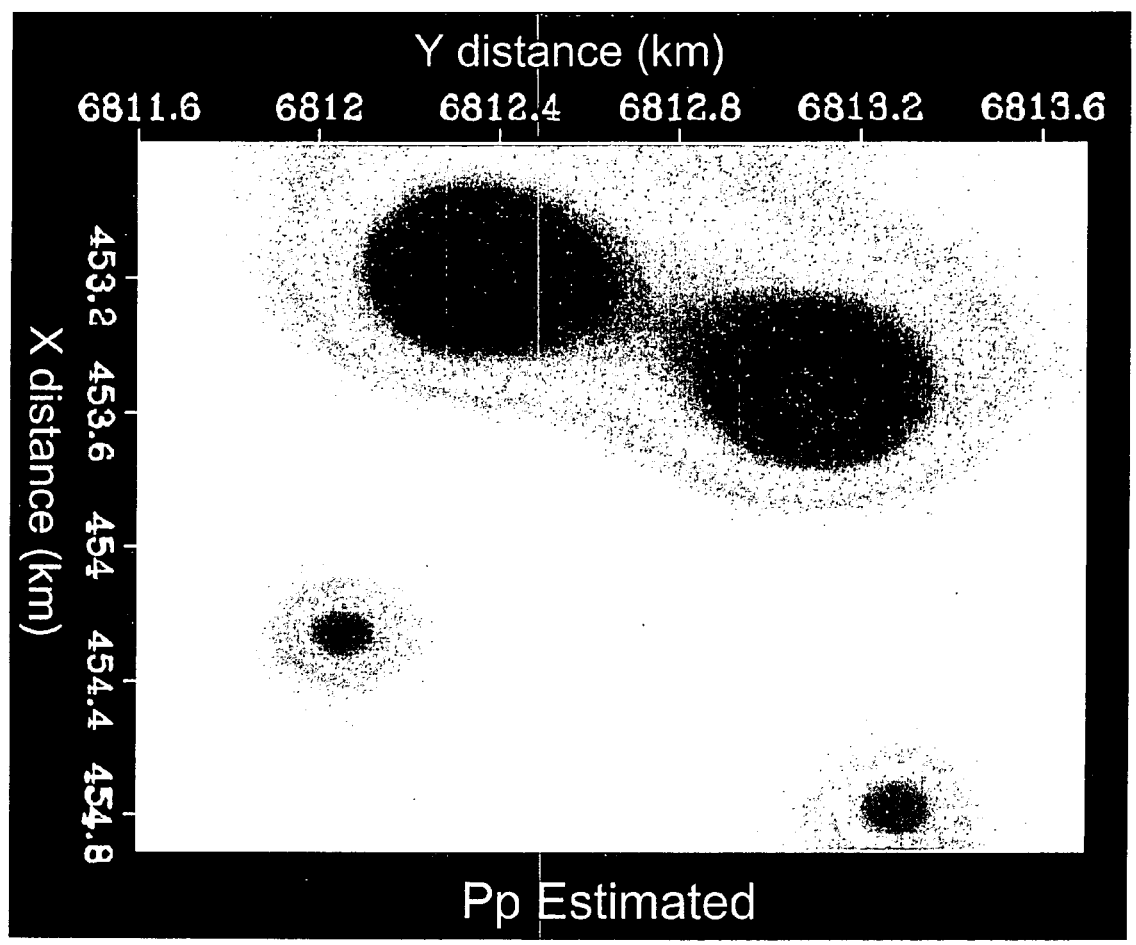
Figure 9C:
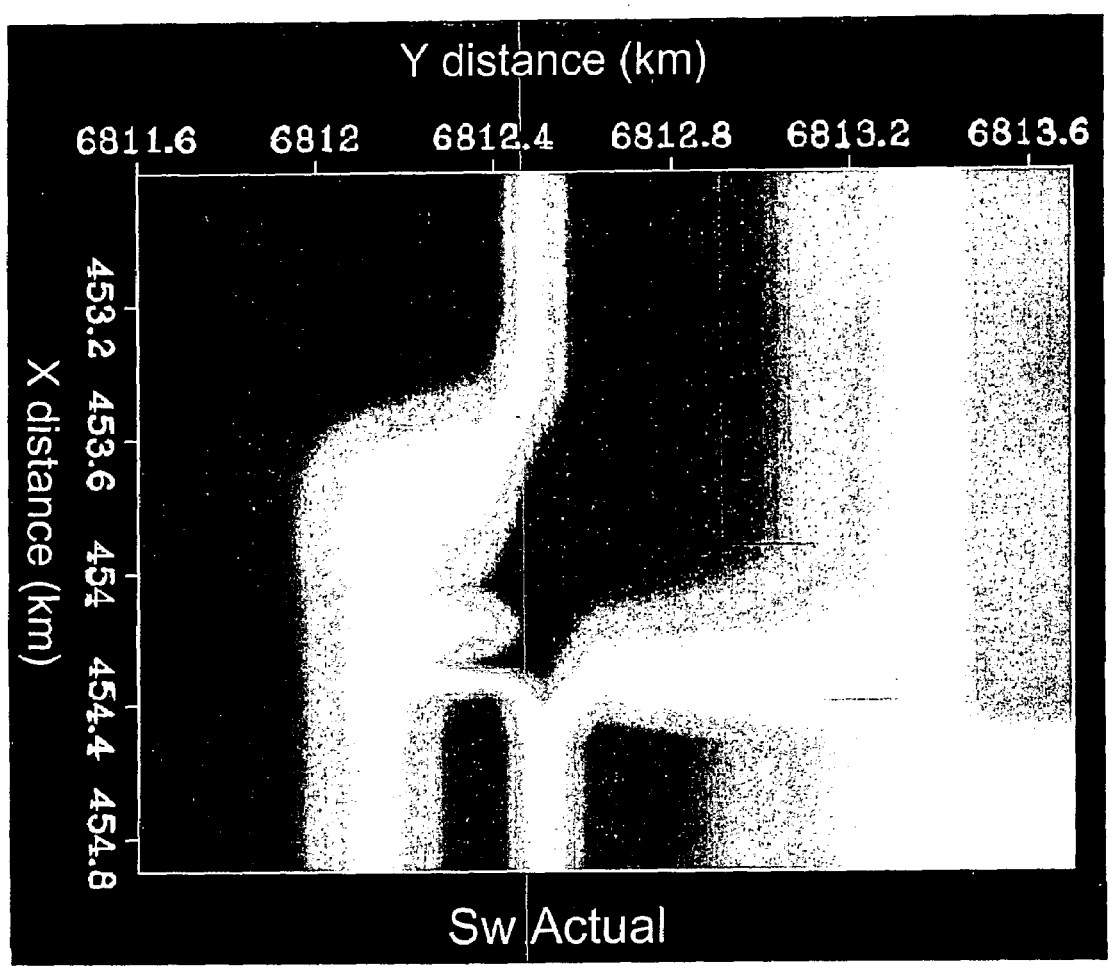
Figure 9D:
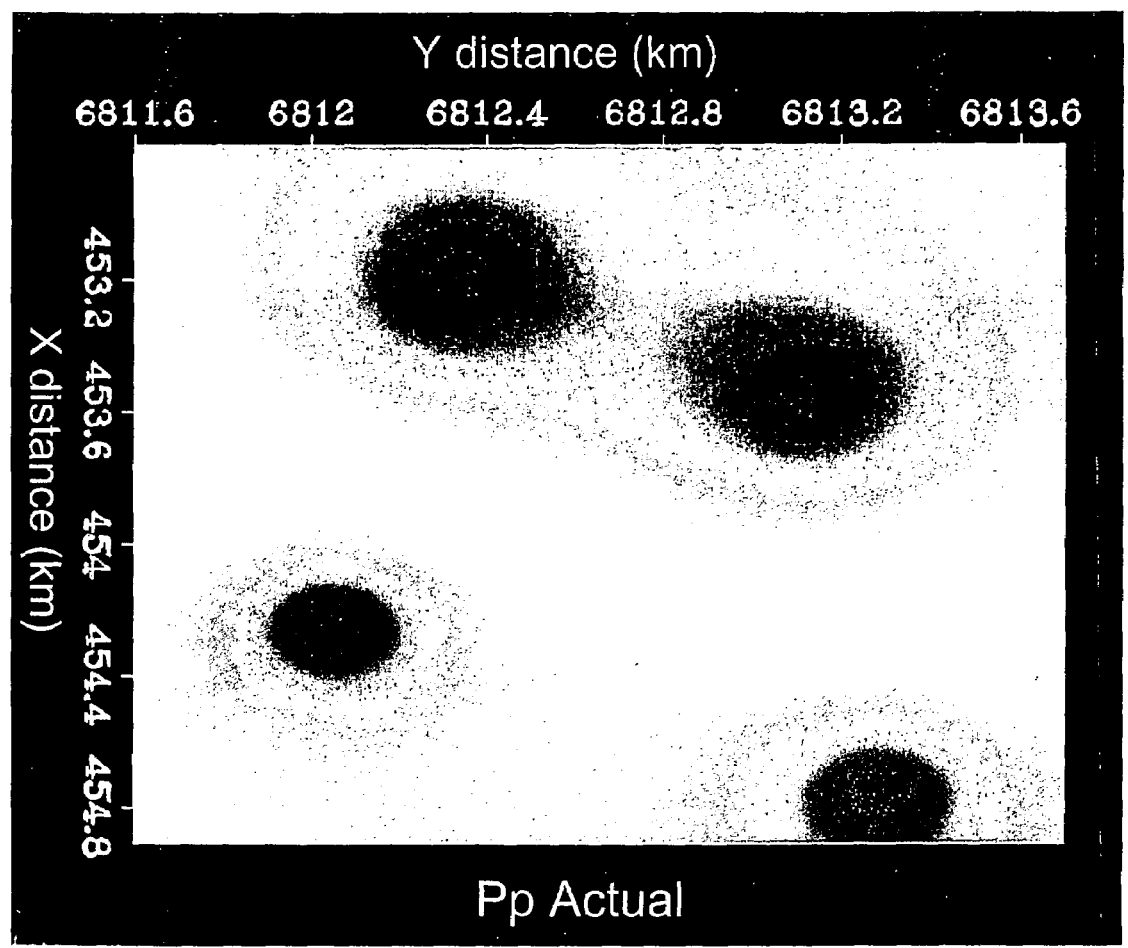

In step 218, the calibrated data from step 216 above are plotted to provide a 2-dimensional representation of the subterranean region under consideration. Reference is now made to FIGS. 9A–9D. This plot represents the time-lapse change in the physical parameters derived and calibrated as described above in regard to steps 202–216 of the method 200. FIGS. 9A and 9B represent the calibrated saturation and pore pressure data from step 216 above, respectively. FIGS. 9C and 9D represent the actual (true) saturation and pore pressure data, respectively. Once again, the colors red and blue are used to indicate parameter value within the FIGS. 9A–9D. Once the data plotting of step 218 is performed, performance of the method 200 is complete.

It is to be understood that the method 200 of FIG. 2 represents one embodiment of the present invention, and that other methods (not shown) corresponding to other embodiments of the present invention can also be used. For example, the methods and teachings of the present invention can be used with other kinds of AVO data that can be forward-modeled from a set of physical parameters. The impedance data exemplified in method 200 represents just one of several possible approaches. As described above, under another embodiment of the present invention, for example, the inversion of step 204 described above would be optional.

Furthermore, other embodiments of the present invention can provide corresponding methods in which the certain steps or operations are performed substantially in parallel with (i.e., concurrent to) other certain steps. For example, another embodiment (not shown; see FIG. 2) can provide for the performing of steps 202 through 206 above substantially in parallel with the performing of steps 208 through 212 above, wherein the respective results of these substantially parallel operations (e.g., the time-lapse data set TL(IP) and TL(IS), and the optimum parameter pairs 338) are then used to perform steps 214 through 218. Other methods and other embodiments of the present invention are also possible.

Figure 10:
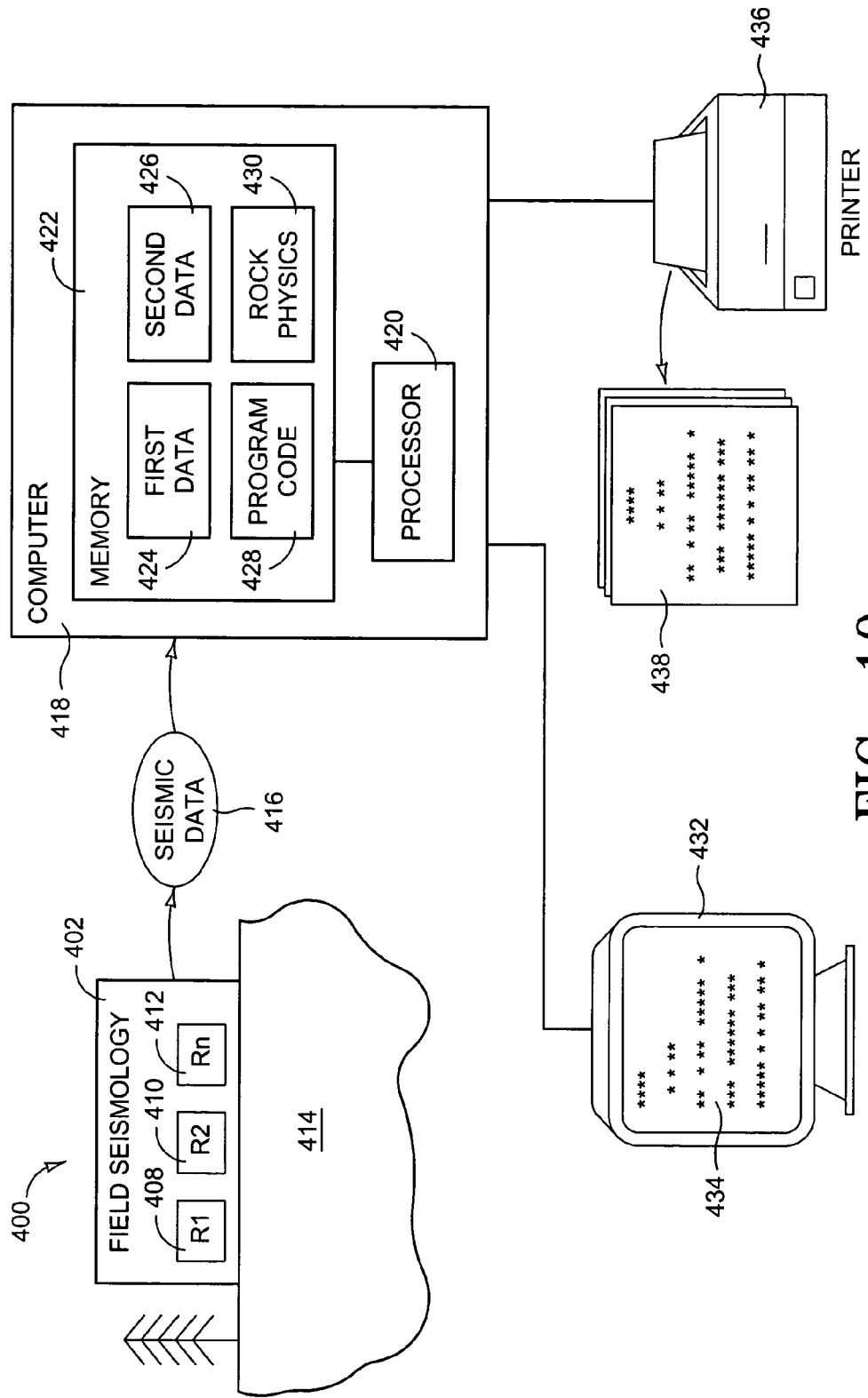
FIG. 10 is a block diagram depicting a data acquisition and processing system in accordance with yet another embodiment of the present invention.

FIG. 10 is a block diagram depicting a data acquisition and processing system (hereafter, system) 400 in accordance with yet another embodiment of the present invention. The system 400 includes a field seismology arrangement 402. As depicted in FIG. 10, the field seismology arrangement 402 includes a plurality of seismic detectors (i.e., receivers) 408, 410, and 412, respectively. The field seismology arrangement 402 is assumed to include at least one source of seismic energy (not shown), and any other elements as required and configured to acquire desired seismic (i.e., AVO or AVA, where AVA is amplitude-versus-angle type seismic data) data corresponding to a subterranean region 414 underlying the field seismology arrangement 402. The field seismology arrangement 402 is further configured to provide one or more acquired seismic data bundles 416 for processing with the balance of the system 400 as described hereafter.

The system 400 also includes a computer 418. The computer 418 includes a processor 420 coupled in data communication with a computer-accessible memory 422. The memory 422 stores a first seismic data set 424 and a second seismic data set 426. The first seismic data set 424 is assumed to be received by the computer 418 and stored in the memory 422, prior to the computer 418 receiving and storing the second seismic data set 426. It will be appreciated that the data sets 424 and 426 can also be stored in a remote memory device which is accessible by the computer 418.

Both the first and second seismic data sets 424 and 426 are delivered to the computer 418 as corresponding seismic data bundles 416, and can be delivered to the computer 418 by way of any satisfactory means. Non-limiting examples of such delivery means (not shown) can include data cable coupling, transferal by way of optical or magnetic storage media, radio telemetry linking, etc. Those of skill in the instrumentation and related arts can appreciate that any number of satisfactory seismic data 416 delivery means can be utilized within the scope of the present invention, and that further elaboration is not required for purposes herein.

The memory 422 further stores a program code 428 that is executable by the processor 420. The program code 428 is configured to cause to the processor 420 to substantially perform the method 200 of FIG. 2 as described above. The memory 422 also stores a plurality of rock physics relationships 430, which are selectively accessed and used by the processor 420 during execution of the program code 428.

The system 400 also includes a monitor 432 that is coupled in signal communication with the computer 418. The monitor is configured to provide a user visible data plot 434 under the control of the processor 420 during execution of the program code 428. The system 400 further includes a printer 436 coupled in signal communication with the computer 418. The printer 418 is configured to provide a hardcopy data plot 438 under the control of the processor 420 during execution of the program code 428.

The computer 418 is further understood to include a plurality of other elements as desired and/or required for normal operation, which are not shown in FIG. 10. Such elements (not shown) can include, for example, a user keyboard, a user mouse, a power supply, etc. One of skill in the computing arts can appreciate that such elements can be respectively included with the computer 418 and configured as desired, and that further elaboration is not required for an understanding of the present invention.

Typical normal operation of the system 400 is as follows: The field seismology arrangement 402 acquires the first seismic data set 424, and at some predetermined period of time thereafter, the field seismology arrangement 402 acquires the second seismic data set 426. The first and second seismic data sets 424 and 426 are delivered to the computer 418 as respective seismic data bundles 416, which stores them accordingly within the memory 422.

Next, execution of the program code 428 by the processor 420 is initiated by a user (for example, by way of a user keyboard or mouse, not shown). The program code 428 then causes the processor 420 to selectively access the first and second seismic data sets 424 and 426, as well as the rock physics relationships 430, which are respectively stored in the memory 422. The processor 420 then uses the data sets 424 and 426 and the rock physics relationships 430 to carry out (i.e., perform) the method 200 of FIG. 2 substantially as described above, thus deriving a calibrated physical parameter data set corresponding to the first and second seismic data sets 424 and 426 provided by the field seismology arrangement 402.

The program code 428 then causes the processor 420 to plot the calibrated physical parameter data set using the monitor 432 and/or the printer 436, resulting in the visible data plot 434 and/or the hardcopy data plot 438, respectively. The plot 434 and/or 438 thus provides a visible representation of the selected time-lapse physical characteristics (i.e., porosity, pressure and/or saturation, etc.) of the subterranean region 414.

In this way, the system 400 of FIG. 10 provides a substantially automated data acquisition and processing system that performs the method of the present invention and provides resulting 2-dimensional data plots 434 and/or 438. The system 400 is particularly suitable for use in monitoring and analyzing time-lapse changes in various physical parameters of subterranean regions (i.e., region 414) that contain hydrocarbons such as crude oil, natural gas, etc, or other fluids such as water. It is to be understood that three-dimensional volumetric plots (not shown) corresponding to a case of three-dimensional inversion can also be provided under the present invention.

Furthermore, it is to be understood that while the methods of the present invention described above consider first and second AVO data sets, any number of suitable data sets can also be considered within corresponding other embodiments (hot shown) of the present invention. Within such embodiments (not shown), the methods and teachings of the present invention would typically be applied to any two suitable data sets at a time.

While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

We claim:

1. A method of modeling seismic data, comprising:
    deriving a time-lapse data set from a first seismic data set and a second seismic data set;
    deriving a forward-modeled time-lapse data set including a plurality of values;
    sorting the plurality of values into a plurality of bins corresponding to the forward-modeled time-lapse data set;
    selecting a plurality of optimal values from the plurality of bins;
    mapping the plurality of optimal values in correspondence with a plurality of subterranean locations using the time-lapse data set;
    calibrating the plurality of optimal values; and
    plotting the plurality of calibrated optimal values.

2. The method of claim 1, and wherein the deriving the forward-modeled time-lapse data set is defined by deriving the forward-modeled time-lapse data set using at least one rock physics relationship.

3. The method of claim 1, and further comprising acquiring the first seismic data set and thereafter acquiring the second seismic data set.

4. The method of claim 1, and wherein the first seismic data set and the second seismic data set both include amplitude-versus-offset signal data.

5. The method of claim 1, and wherein the first seismic data set and the second seismic data set both include amplitude-versus-angle signal data.

6. The method of claim 1, and wherein the first seismic data set and the second seismic data set both include data corresponding to reflected acoustic wave energy.

7. The method of claim 1, and wherein the deriving the forward-modeled time-lapse data set is defined by deriving the forward-modeled time-lapse data set using respectively selected pore pressure and saturation and porosity relationships.

8. The method of claim 1, and wherein the deriving the time-lapse data set is defined by calibrating each of the first seismic data set and the second seismic data set and thereafter subtracting the calibrated second seismic data set from the calibrated first seismic data set.

9. The method of claim 1, and wherein the deriving the time-lapse data set is defined by inverting and then calibrating each of the first seismic data set and the second seismic data set and thereafter subtracting the calibrated inverted second seismic data set from the calibrated inverted first seismic data set.

10. The method of claim 1, and wherein the plotting the calibrated values is defined by plotting the calibrated values to visually represent a spatial distribution of at least one physical characteristic of a subterranean hydrocarbon reservoir.

11. The method of claim 1, and wherein the selecting the plurality of optimal values sorted into the plurality of bins is performed in response to comparing the plurality of values with at least one comparison value, and wherein the at least one comparison value optionally includes a reservoir measurement value.

12. The method of claim 1, and wherein the calibrating the plurality of optimal values is performed in response to comparing the plurality of optimal values with at least one comparison value, and wherein the at least one comparison value optionally includes a reservoir measurement value.

13. A method of modeling seismic data corresponding to a subterranean reservoir containing hydrocarbons, comprising:
calibrating each of a first seismic data set and a second seismic data set;
subtracting the calibrated second seismic data set from the calibrated first seismic data set to derive a time-lapse data set;
deriving a forward-modeled time-lapse data set including a plurality of physical parametric values;
sorting the plurality of physical parametric values into a plurality of bins corresponding to the forward-modeled time-lapse data set;
selecting a plurality of optimal physical parametric values from the plurality of bins of physical parametric values;
mapping the plurality of optimal physical parametric values to a corresponding plurality of subterranean locations using the time-lapse data set;
calibrating the plurality of optimal physical parametric values; and
plotting the plurality of calibrated optimal physical parametric values as a visual presentation of the subterranean reservoir containing hydrocarbons.

14. The method of claim 13, and wherein:
the calibrating each of the first seismic data set and the second seismic data set is performed in response to comparing each of the first seismic data set and the second seismic data set with at least one comparison value; and
the at least one comparison value optionally includes a reservoir measurement value.

15. The method of claim 13, and wherein the first seismic data set and the second seismic data are respectively defined by an inverted first seismic data set and an inverted second seismic data set.

16. The method of claim 13, and wherein the deriving the forward-modeled time-lapse data set is defined by deriving the forward-modeled time-lapse data set using a rock physics relationship.

17. The method of claim 16, and wherein the rock physics relationship corresponds to a selected one of a pressure relationship, a saturation relationship, or a porosity relationship.

18. The method of claim 13, and wherein the selecting the plurality of optimal physical parametric values sorted into the plurality of bins is performed in response to comparing the plurality of physical parametric values with at least one comparison value, and wherein the at least one comparison value optionally includes a reservoir measurement value.

19. The method of claim 13, and wherein the calibrating the plurality of optimal physical parametric values is performed in response to comparing the plurality of optimal physical parametric values with at least one comparison value, and wherein the at least one comparison value optionally includes a reservoir measurement value.

20. The method of claim 13, and wherein the first seismic data set and the second seismic data set both include amplitude-versus-offset signal data.

21. The method of claim 13, and wherein the first seismic data set and the second seismic data set both include amplitude-versus-angle signal data.

22. The method of claim 13, and wherein the first seismic data set and the second seismic data set both include data corresponding to reflected acoustic wave energy.

23. A computer, comprising:
a processor;
a computer-readable storage medium coupled in data communication with the processor, the computer-readable storage medium storing a first data set and a second data set and a plurality of rock physics relationships and a program code, the program code configured to cause the processor to:
calibrate each of the first data set and the second data set;
subtract the calibrated second data set from the calibrated first data set to derive a time-lapse data set;
calculate a forward-modeled time-lapse data set including a plurality of parametric values using selected ones of the plurality of rock physics relationships;
sort the plurality of parametric values into a plurality of bins corresponding to the forward-modeled time-lapse data set;
select a plurality of optimal parametric values from the plurality of parametric values sorted into the plurality of bins;
map the plurality of optimal parametric values to a corresponding plurality of subterranean locations using the time-lapse data set;
calibrate the plurality of optimal parametric values; and
plot the plurality of calibrated optimal parametric values to visually represent at least one spatially distributed physical characteristic of a subterranean reservoir of hydrocarbons.

24. The computer of claim 23, and wherein the first data set and the second data set stored in the computer-readable storage medium both include one of amplitude-versus-offset data, or amplitude-versus-angle data.

25. The computer of claim 23, and wherein the first data set and the second data set both include data corresponding to reflected acoustic wave energy.

26. The computer of claim 23, and wherein the program code stored within the computer-readable storage medium is further configured to cause the processor to:

compare each of the first data set and the second data set with at least one comparison value; and calibrate each of the first data set and the second data set in response to the comparing.

27. The computer of claim 23, and wherein the first data set and the second data set are respectively defined by an inverted first data set and an inverted second data set.

28. The computer of claim 23, and wherein the plurality of rock physics relationships stored in the computer-readable storage medium are defined by at least one of pressure relationships, saturation relationships, or porosity relationships.

29. The computer of claim 23, and wherein the program code stored in the computer-readable storage medium is further configured to cause the processor to compare the plurality of parametric values sorted into the plurality of bins with at least one comparison value, and to select the plurality of optimal parametric values in response to the comparing.

30. The computer of claim 29, and wherein the at least one comparison value includes a measurement value corresponding to the subterranean reservoir containing hydrocarbons.

31. The computer of claim 23, and wherein the program code stored in the computer-readable storage medium is further configured to cause the processor to compare the plurality of optimal parametric values with at least one comparison value, and to calibrate the plurality of optimal parametric values in response to the comparing.

32. The computer of claim 31, and wherein the at least one comparison value includes a measurement value corresponding to the subterranean reservoir containing hydrocarbons.

33. The computer of claim 23, and wherein the program code stored in the computer-readable storage medium is further configured to cause the processor to plot the plurality of optimal parametric values selectively using one of a monitor or a printer coupled to the computer.

34. The computer of claim 23, and wherein the at least one spatially distributed physical characteristic of the subterranean reservoir containing hydrocarbons is defined by at least one of a porosity, a pressure, or a saturation.

* * * * *